United States Patent [19]

Kellenbenz

[11] 4,396,882
[45] Aug. 2, 1983

[54] INRUSH CURRENT LIMITER

[76] Inventor: Carl W. Kellenbenz, 8051 Old Annapolis Rd., Pasadena, Md. 21122

[21] Appl. No.: 316,162

[22] Filed: Oct. 29, 1981

Related U.S. Application Data

[63] Continuation-in-part of Ser. No. 266,237, May 22, 1981, abandoned.

[51] Int. Cl.³ .............................................. H02H 7/20
[52] U.S. Cl. ................................... 323/278; 323/902; 323/908; 323/58; 323/101
[58] Field of Search ....................... 323/273, 276–278, 323/299, 303, 311, 312, 902, 908; 361/18, 58, 101

[56] References Cited

U.S. PATENT DOCUMENTS

| 3,514,690 | 5/1970 | Quiros | 323/312 |
| 3,638,102 | 1/1972 | Pelka | 361/58 |
| 3,678,291 | 7/1972 | Coe | 361/101 |
| 3,769,572 | 10/1973 | Doubt | 361/18 X |
| 3,979,645 | 9/1976 | Wittenzellner | 361/18 X |

Primary Examiner—A. D. Pellinen
Attorney, Agent, or Firm—R. F. Beers; L. A. Marsh

[57] ABSTRACT

An inrush current limiter includes at least a two-terminal circuit in series with a power load having a high gain high current Darlington transistor, a driver transistor for the high gain high current Darlington transistor, a current sensing resistor, a base-drive resistor, and a diode bridge interfaced for providing a peak-current-limiting function by proportional adjustment of the voltage to the power load as a function of current.

3 Claims, 4 Drawing Figures

Basic Inrush Current Limiter

Solid State Relay with Inrush Current Limiter

SAFE OPERATING AREA PROTECTION FOR INRUSH CURRENT LIMITER

TEST CIRCUIT FOR INRUSH CURRENT LIMITER

INRUSH CURRENT LIMITER

This application is a continuation-in-part of application Ser. No. 06/266,237 filed May 22, 1981, of the same title, now abandoned.

BACKGROUND OF THE INVENTION

1. Field of the Invention

This invention relates to electrical elements for limiting current passing through equipment, and more particularly relates to a peak-current-limiting element for protecting electrical equipment. Moreover, an energy savings is thus realized in the use of this invention by controlling energy consumption.

2. Description of the Prior Art

The use of various electrical elements have been used in the past as protectors. One is a solid state current dependent resistor type device. Such a device is a specially formulated metal oxide ceramic material that is capable of surpressing high inrush current surges. Such a device consists of two wires connected in series with a load and possesses the characteristic that the resistance decreases from a high value to low value once current flow is initiated. Such a device is only available in fixed increments of "cold" resistance values, usually of relatively low values. Thus, the degree of control is limited. Further, once the circuit where the device is employed is energized and the device is in full conduction, it will no longer provide the current limiting function. Therefore, if a transient occurs on the system after the limiting device is in full conduction, the device will provide no further current limiting during the surge.

Another type protector is series resistors that are shorted out by means of a contactor or solid state semiconductor device after an initial surge. This protector uses a fixed resistor inserted in series with an electrical load to provide current limiting. Such resistor is shorted out by either a contactor or a solid state switch (semiconductor) after either a predetermined period of time or after the voltage across the load has reached a predetermined value. Such shorting out immediately after the initial energizing of the load allows no further inrush protection in the event of a voltage surge or transient on the power bus. Further, the current-limiting function is only active during the application of voltage to the circuit and is not resettable until the circuit is deenergized and power is re-applied. Moreover, the circuit does not directly sense current and thus provide a continuous control of the peak-current value.

Another type protector is a ramp increase of solid state switch conduction (phase-angle control) for AC use or ramp increase of pulse—width—modulated chopper control for DC use. This protector utilizes variable conduction times of portions of the total frequency to adjust the effective or average voltage to the load to accomplish a current-limiting function. This protector allows little or substantially no limiting of the peak value of the current for DC or square wave voltage sources. This is particularly true of the pulse-width modulated scheme where the duty-cycle of the applied voltage is varied to achieve a low average value of current. In such instance the full amplitude of the source voltage is applied to the load and thus the peak current is not limited. With phase-angle control of a sinusoidol power-source wave, the amplitude of the peak current is somewhat controllable by controling the conduction angle. However, the minimum conduction angle usually achievable represent a minimum peak voltage that is 5 to 10 percent of the source voltage. Therefore, total peak—current—limit control is not achieveable. Further, the circuit necessary to achieve either phase-angle control or pulse—width—modulated control with a current feedback has numerous parts and complex circuitry creating a large package size. Moreover, additional circuitry must be incorporated in each of these methods to provide a time rate of increase of the duty cycle (phase-angle) or a current dependent decrease in duty cycle (phase angle) to allow achieving a current-limit control. Again, this increases the circuit complexity. And, unless the current-dependent decrease in duty cycle (phase angle) is employed, current limit can be achieved only during the initial energizing of the load. Therefore, an this case, no current-limit protection would exist for a voltage transient surge that occurs after the initial energization.

During the active operation of this switching type circuitry, the power source waveform is chopped to achieve the average-current limiting effect. Thus, during this time harmonics in the power system and load exist because of the chopping effects. Such can result in interactions and interferences with certain type loads.

SUMMARY OF THE INVENTION

Accordingly, one object of the invention is to provide a minimum package size for the current-limiting apparatus of this invention.

Another object of the invention is to provide a simple two terminal circuit that can be connected in series with any load for performing the current limiting function.

Another object of the invention is to provide a continuously available peak current limiting capacity, not only when a load is initially energized, but on any surge condition.

Still another object of the invention is to provide an apparatus that is equally useful for AC or DC circuit applications.

Yet another object of the invention is to provide an apparatus that performs a current limiting function by controlling the conduction degree of a transistor and thus functions as a variable resistance device.

A further object of the invention is to provide an actual sensing of the peak current value of the current to the load and limits the maximum value of the peak current independent of whatever the power source voltage may be.

And, a still further object of the invention is to provide effective controls of the peak current allowed to flow to the load by possessing the capability of adjusting the peak value of voltage applied from zero to full power source voltage as a function of current on a continuous basis.

Yet another object of the invention is to provide a circuit that is adaptable to remote control capability to allow the design of a solid state relay that incorporates optical isolation and the inrush current limiting function.

A further object of the invention is to provide the inrush current limiting function with a circuit that is self-protective using a safe-operating area protection circuit to protect against deterioration or changes in inrush load characteristics with time.

Briefly, these and other objects of this invention are achieved by providing an inrush current limiter apparatus comprising a two-terminal circuit means in series with a power load having a high gain, high current Darlington transistor means, a driver transistor means for said high gain high current Darlington transistor means, a current sensing resistor means, a base-drive resistor means and a diode bridge means for providing a peak-current-limiting function by proportional adjustment of the voltage to the load as a function of current. Other alternatives yielding equivalent results are discussed later.

DESCRIPTION OF THE PREFERRED EMBODIMENTS

Figure 1:
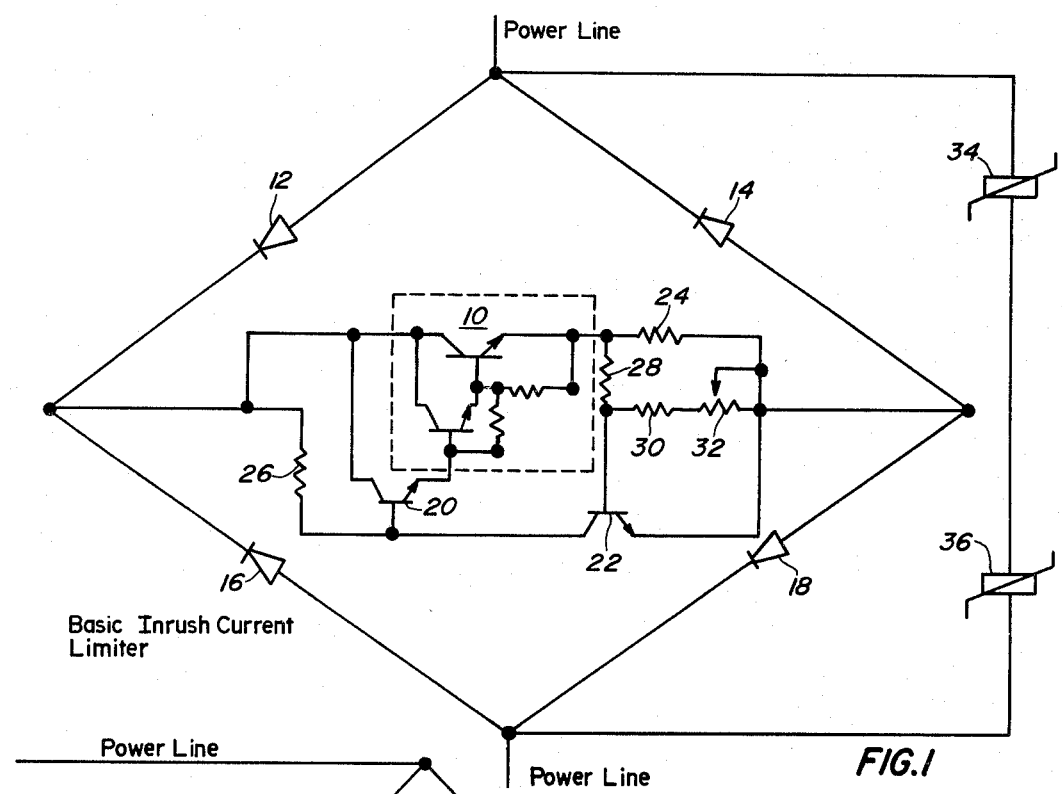
FIG. 1 is a schematic drawing of the electrical circuitry of the inrush current limiter apparatus.

The inrush current limiter apparatus circuit is a two terminal circuit that can be connected in series with any load to perform a current limiting function.

The circuit arranged with the Darlington power transistor 10 is connected across the DC output of a bridge rectifier consisting of diodes 12, 13, 14 and 15. The AC input section of the bridge is connected in series with the power source and load. The voltage adjustment to the load, and thus the peak current adjustment, is accomplished by controlling the degree of conduction of the transistor 10. This, in effect, becomes a current controlled resistor connected across the bridge output. Thus, as the bridge is in series with the load, the variable resistance on the DC side of the bridge also becomes a variable resistance on the AC side of the bridge. The bridge converts the unidirectional proportional current control transistor to a bidirectional symmetrical current control apparatus for AC power control.

The peak current sensing and adjusting function is accomplished by transistors 10, 20 and 22 in conjunction with resistors 24 and 26. Resistor 26 provides base current to transistors 10 and 20 sufficient to drive said transistors to full conduction. Resistor 24, however, disallows full conduction, as it controls anytime the load current exceeds minimum allowable peak current value. Resistor 24, in one example, is selected to give a 0.7 volt drop across it at the load current value that corresponds to the maximum allowable peak value. When the drop reaches 0.7 volts, that is, load current reaches maximum peak value, transistor 22 begins to conduct and effectively begins shorting the bases of transistors 10 and 20 to the emitter of transistor 10 via the current sensing resistor 24. This diverts the base current that normally flows through resistor 26 away from the bases of transistors 10 and 20 and thus causes transistors 10 and 20 to become less conductive. As transistor 10 becomes less conductive more of the power source voltage appears across the series bridge and less appears across the load. Therefore, the current to the load is controllable in accordance with the current sensed in resistor 24, and the degree of conduction of transistor 22 and the resultant degree of conduction of transistors 10 and 20. In this instance, transistor 20 is Darlington connected to transistor 10 to make a three transistor Darlington connection. Such connection provides the high overall gain of this transistor network. The high gain is critical to the operation of this circuit. It minimizes the base current necessary to drive transistors 10 and 20 into saturation. It also allows resistor 26 to be a small low wattage resistor since the current required to flow through it is dependent on the overall gain of the combination of transistors 10 and 20. The high gain is necessary to allow substantially full conduction of transistors 10 and 20 to be maintained since the voltage present and available across resistor 26 to maintain transistors 10 and 20 in conduction is very small when they are close to full conduction. Therefore, the bridge transistor combination is necessary to provide a continuous variable, current proportional, waveform symmetrical adjustment of the circuit output.

The low base current to transistors 10 and 20 is mandatory to allow usage of a low current, small size for transistor 22 and to allow the gain of transistor 22 to be sufficient to provide the proper clamping effect on the bases of transistors 10 and 20.

Transistor 20 selection for this circuitry is important. Since this circuitry is applicable to many designed end uses, transistor 10 must not only be chosen for its high-gain, and high-current capabilities it also must possess a sufficient VCEO rating to withstand the maximum voltage stresses of its application. The voltage level may have to be selected to be considerably higher than the maximum peak source voltage since it will be maintaining a peak current limit in the presence of voltage transient surges. Such voltage rating is dependent upon the maximum transient voltage present in the contemplated system design to be used plus any desirable de-rating factors.

Transistor 10 must also possess a very high safe operating area (SOA) value. Such value defines the maximum allowable value of the simultaneous voltage across the device and the current through the device as a function of allowable duration for their existence. The standard SOA curves illustrate a series of curves for various time values ranging from DC (continuous) to as short a time as 10 microseconds. In the contemplated design of the circuit for a particular application the duration of inrush current must be ascertained, as well as, the value selected as the maximum peak allowable current. These two parameters combined with the voltage level across the transistor during the peak limiting condition are required to insure reliability of the system.

Figure 2:
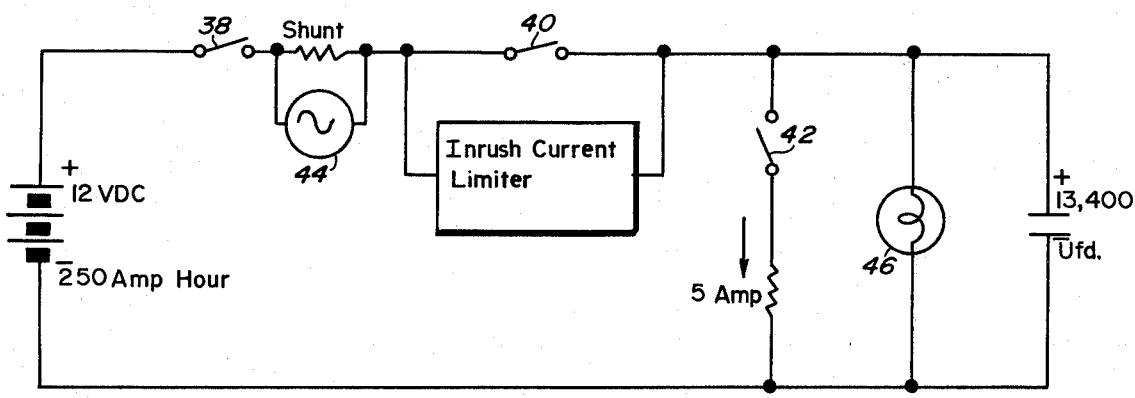
FIG. 2 is a schematic drawing of an electrical circuit for testing of the inrush current limiter apparatus.

FIG. 2 illustrates a test circuit for the inrush-current apparatus of the invention. A baseline measurement of a simulated surge condition is made by having switch 40 closed and switch 42 open and then abruptly closing switch 38. The amplitude and duration of the surge current is recorded by monitoring the current through the shunt with oscilloscope 44. The light bulb 46 is a visual indication that the circuit is energized and provides a bleeder resistance to discharge the 13,400 microfarad capacitor. Verification of satisfactory performance of the inrush limiter is obtained by opening switch 40 and then closing switch 38. Switch 42 can be opened or closed for the purpose of simulating the existence of a continuous current load after the disappearance of the surge.

Figure 3:
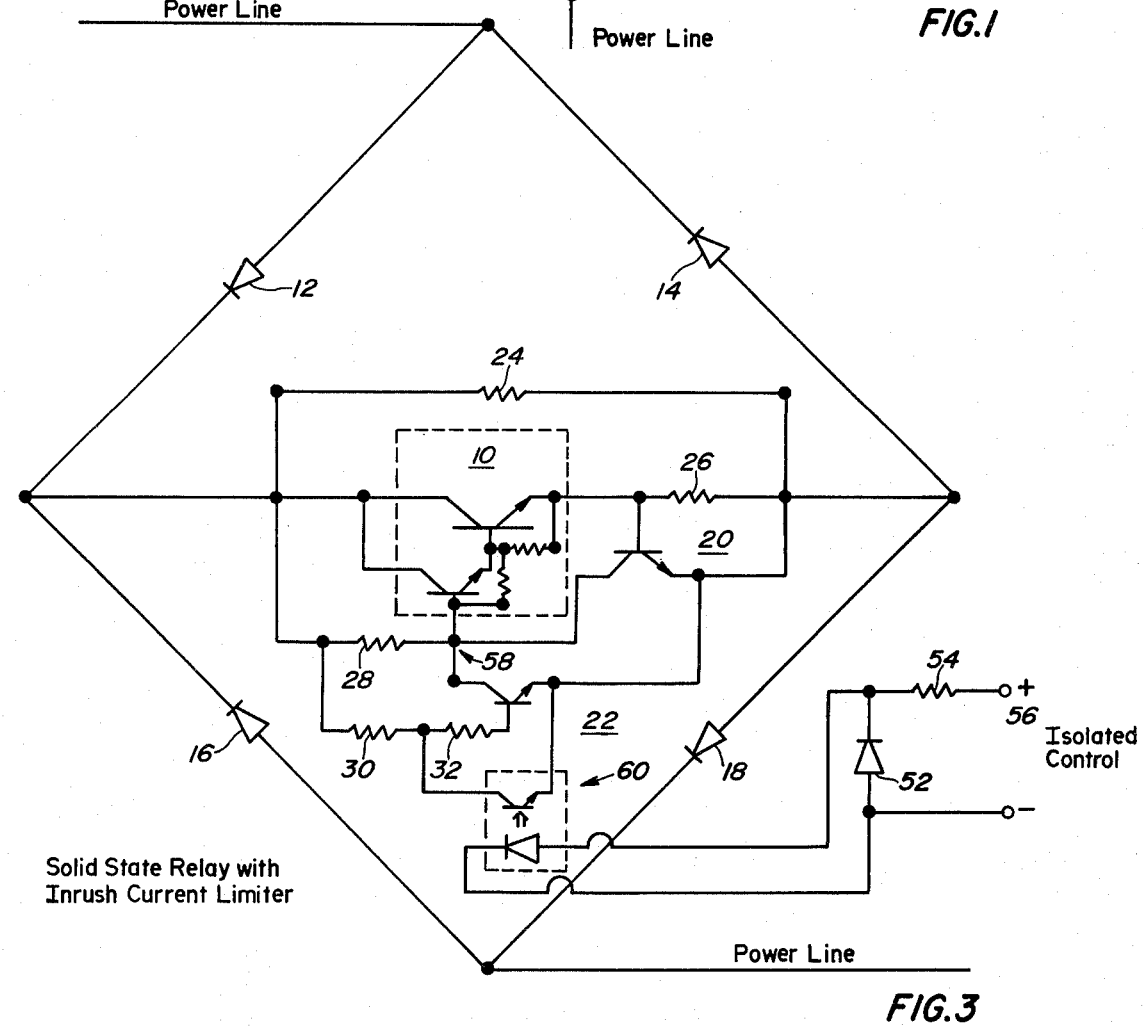
FIG. 3 is a schematic drawing of a second embodiment of the electrical circuitry of the inrush current limiter apparatus illustrating its use as an AC or DC solid state relay.

FIG. 3 illustrates a second embodiment of the inrush current limiter apparatus. This embodiment functions identical to the basic inrush current limiter apparatus except for some additional parts that convert the circuit to a solid state relay useable either for AC or DC circuits. The added components provide remote "on-off" switching required of a solid state relay. They consist of resistors 30, 32, and 54; transistor 22, diode 52, and photocoupler 60. This circuitry performs the controlling function by controlling the base current provided to Darlington transistor 10 at control point 58. Under operating conditions where power line voltage is present but it is desired to have the relay open, i.e. no control signals 56 present, transistor 22 is driven into conduction by the base current through resistors 30 and 32. When transistor 22 is conducting, control point 58 is tied to emitter of Darlington power transistor 10 through low value resistor 26. This holds transistor 10 out of conduction and the relay remains open with only the current through resistors 28 and 24 (very low) allowed to flow through the load. When control signal 56 is present, current flows through current limiting resistor 54 to the light emitting diode (LED) of photo-coupler 60. The transfer characteristics of photocoupler 60 allows the phototransistor to be driven into activation when a low value of current is flowing through the LED (a few milliamperes to about 20 milliamperes). Resistor 32 insures that transistor 22 can be turned off with moderate saturation voltage levels of the phototransistor of photocoupler 60. Diode 52 protects the LED of photocoupler 60 from destruction due to reverse voltage. Thus, in summary, the conduction of transistor 10 in the second embodiment becomes dependent on the amplitude of the load current (conduction of transistor 20) and on the status of control signal 56. The central point of common control is at the base of power transistor 10. In some designs, additional transistors may be connected in the Darlington power transistor 10 connection to provide overall gain necessary to minimize the base current flow (and also the "off" state load current flow) to the Darlington power transistor 10. Resistor 24 may also be necessary to adjust the low value of current that may be required to flow to the load when the relay is in the off state to allow series connection of several solid state relays.

The advantages of the second embodiment include retaining all the characteristics of the basic inrush current limiter apparatus and have the additional feature of the capability of remotely controlling the on-off switching of the load. Another feature is its capability of providing a solid state relay that uses optical isolation between the control and power circuit to prevent undesirable relay "closing" due to electrical noise and to provide low level signal control capability that is compatible with microprocessors and computers. Another feature is its capability of providing load current on-off switching and inrush current limiting using a circuit that requires only two connections in the power circuit with the connections made in series with the load. A double pole or multiple pole relay can be devised by using one of these circuits in each pole position and by connecting control signal 56 circuits in series. A further fdature provides the function of a normally closed relay by the addition of another circuit identical to resistors 30 and 32 and transistor 22 between the aforementioned circuit and the phototransistor of photocoupler 60. And, still further another feature provides the capability of zero switching by adding a circuit that detects the zero crossing of the sine wave and drives the output transistor into conduction for the entire half-cycle.

Figure 4:
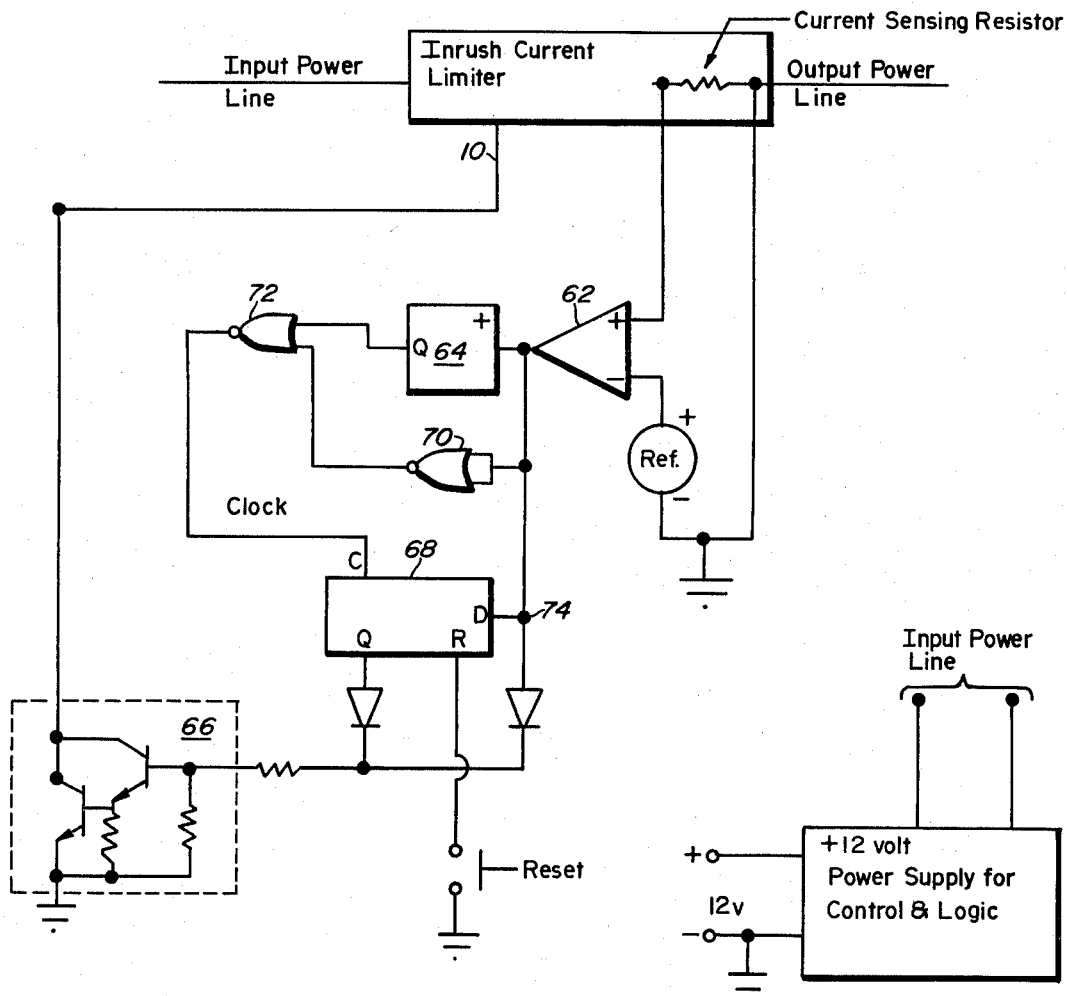
FIG. 4 is a block diagram of a Safe-operating Area Protection Circuit for the inrush current limiter apparatus.

FIG. 4 illustrates a third embodiment—a safe-operating area protection circuit for the inrush current limiter apparatus. This embodiment variation to the basic invention is used in situations wherein the inrush current limiter apparatus is indescriminately applied and it becomes necessary to insure the output Darlington transistor 10 stage is not destroyed due to operating the transistor outside the apparatus rated safe-operating area. This can occur if uncertainty exists about the nature and characteristics of the load on the inrush current limiter apparatus. FIG. 4 illustrates the circuitry defined by block diagram of this embodiment. This embodiment requires connections to both input power lines to provide power for the logic and control circuitry associated with the SOA protection. Therefore, these connections must be madd to the power lines and the unit is no longer a two terminal device that can be connected in series with connections made to only one power line. This embodiment, in operation, the input power is applied to the inrush current limiter apparatus. If the current level required by the load exceeds a predetermined value, a high level signal appears at the output of comparator 62 for the duration of the time that the current exceeds this value. The reference voltage input to comparator 62 establishes this value. Two events occur when this level is exceeded. First, the one-shot multivibrator 64 is triggered to provide an output pulse that stays high for the duration of the time that the excessive current is allowed to flow. This time is established by correlation of the transistor SOA curves with the load characteristics. A signal is also provided that causes the clamping transistor 66 to pull Darlington transistor 10 out of saturation for times when the load current exceeds the desirable level. This signal then automatically maintains the load current at a value slightly higher than the desired level that is established by the reference signal. The NOR gate 70 connected to the output of comparator 62 is connected as an inverter to invert the comparator 62 signal. NOR gate 72 functions as a true NOR gate and provides an output signal for the condition where the output of one-shot multivibrator 64 goes low and comparator 62 output signal is still high. This is the condition that corresponds to reaching the predetermined critical safe-operating area point of Darlington transistor 10. A "D" type flip-flop 68 is used to capture this condition and lock clamping transistor 66 in the on state, thus causing a locked-out condition where no current is allowed to flow to the load until the unit is reset. Flip-flop 68 locks out the current flow by sampling the signal from comparator 62 on data transfer terminal 74 and clocking this high level signal to the output of flip-flop 68 when the predetermined time of one-shot multivibrator 64 has expired. Thus, the inrush current limiter apparatus latches into a tripped mode due to exceeding safe operating limits when the time of one-shot multivibrator 64 has elapsed and the current to the load still exceeds the predetermined maximum level. This condition doesn't occur during normal operation of the load but can occur due to changes in the load characteristics with time.

The advantages of this invention are many fold. It allows a two terminal circuit be connected in series with any load to perform the current limiting function. It further allows a continuously available peak current limiting capability. It is equally useful for AC and DC current. It contains few parts and can thus use hybrid power construction techniques in very small packaging yielding to end uses heretofore unavailable, such as, light switches, lamp sockets, automobile switches, relays etc.

What is claimed is:

1. A two terminal inrush current limiter placed in series with 2 power lines and a load for providing a continuous controllable limitation to the peak current delivered to an AC or DC load independent of power source voltage comprising:
   a first circuit means for controlling the conduction of a Darlington power transistor in direct proportion to the peak current delivered to the load responsive to a surge condition of known duration,
   a second circuit means for sensing peak current to the load and effecting control of base current to said Darlington transistor utilizing a small, low voltage control transistor to effect control of currents in the hundreds of amperes range,
   a third circuit means for serving as a driver transistor for said Darlington transistor for use in combination with said control transistor and having a base drive resistor for providing minimal voltage drop across said inrush current limiter during times when no surges exist and, for providing adequate base drive to allow said Darlington transistor to provide current to the load in correspondence to said peak current limit setting, said circuit further providing compensation for decreasing values of said Darlington transistor gain values occurring with operation at high peak values of collector current,
   a fourth circuit means wherein said Darlington transistor, in an operating region beyond its continuous current rating at high peak values of collector current and wherein transistor ratings are defined by the safe-operating-area (SOA) curves for said transistor, said SOA curve utilized for combinational values of allowable peak current and surge duration such that the SOA curve for said transistor is coordinated with the decay characteristics of the surge condition,
   a fifth circuit means wherein said inrush current limiting circuitry is connected across the DC side of a single phase full wave rectifier diode bridge assembly for providing operation of AC circuits and non-polarity sensitive installation in DC circuits, said rectifier bridge having size and current rating reductions with current levels to match the low continuous current flow to the load, thus allowing matching of the surge current ratings of the diodes with the peak current limit value and the surge duration of the load,
   a sixth circuit means wherein varistors are connected across said two power line terminals of said inrush current limiter and having voltage levels equal to the maximum BVceo rating of said Darlington transistor for providing said limiter with capability of limiting the surge to load in the event of very high voltage transients, said varistors serve to divert the current to the load away from said Darlington transistor and diode assembly prior to a voltage breakdown of said transistor, said varistor network consisting of at least two varistors in series for distributing the power handling requirements for the high current values encountered and to minimize size and weight of the entire limiter circuit, said varistor breakover voltage values, Darlington transistor Vceo rating, peak current limit setting, and surge decay characteristics being collectively established for providing the maximum peak current limiting capability that is commensurate with the SOA ratings of the transistor,
   a seventh circuit means wherein the drive resistor for the Darlington transistor provides for adequate base drive for said transistor under high peak current conditions during times when said transistor is in the active operating region and the collector-base voltage is relatively high, and to maintain adequate base drive to said transistor when required to remain fully conductive (saturated) during times when current surges do not exist, said resistor having low values for providing transistor automation during times of no surge conditions for minimizing standby power dissipation, and having relatively high values during times of a surge condition for providing a controllable current value not to exceed capabilities of current control transistor,
   an eighth circuit means wherein adjustments of peak current limit settings and component selection for the limiter are such that the peak current limit value is approximately 2 to 10 times the normal current value drawn by the load to provide sufficient surge current to the load to allow proper load function, and
   a ninth circuit means wherein all power handling components have their power and current ratings selected based on the continuous current and average power requirement rather than on the amplitude and duration of the surge condition for minimizing size, weight, and heat dissipation requirements by a factor of up to 10 times since the peak-current limit value will be set up to 10 times higher than the normal continuous current.

2. A two terminal inrush current limiter as in claim 1 wherein said limiter is incorporated into a solid state relay and the circuitry consists of:
   a first circuit means connected to only one of the two power lines by placing said circuitry in series between said power source and said load,
   a second circuit means connected to the base of said Darlington output transistor of said limiter for providing an ORed control function in combination with said peak current limit control transistor wherein said circuitry responds as an on-off switch in accordance with said second circuit means and providing for simultaneous overriding current control to provide a peak current limit function anytime said switch is in the on state, thus providing peak current limit at any time rather than just during times switch is being energized,
   a third circuit means wherein an optical coupler is utilized for providing the control signal to said current limiter circuitry wherein only two connections are made to the power line to achieve a solid state relay with inrush current limiting capabilities, said optical coupler connections being such that resistor 32 in combination with transistor 22 limits the voltage across the photo-transistor of the optical coupler to values less than the 30 volt maximum rating for said photo-transistor for providing sufficient voltage across the limiter circuit when the solid state relay is in the off state, to allow proper operation of the switching control circuitry without requiring an auxiliary power supply,
   a fourth circuit means wherein resistor 24 is connected across said current limiting circuitry for providing a controllable value of leakage current to the load when said solid state relay is in the off mode, said resistor establishes said leakage values and allows series connections of solid state relays in power system for providing a controlled leakage current that insures equal voltage division across the series relays in the off mode to allow for operation in the series connected mode, a fifth circuit means wherein the LED of the photocoupler is utilized to provide an optically isolated control function for the relay with control characteristics requiring signal levels of a few milliamperes for control and thereby interfacing said relay compatible and useful with computer and microprocessor control schemes, and a sixth circuit means wherein said circuit of said solid state relay as illustrated in FIG. 3 is utilized to construct a multiple pole relay with each pole possessing independent peak current limiting thereby allowing setting of different limiting values in each pole, said control circuit of said multi-pole relay constructed such that all LED's of the photo-coupler are series connected to the same control source for providing simultaneous energization and de-energization of the multiple pole relay, said multiple pole relay having independent surge current limiting capability based on said limiting and switching circuit requires only two connections to the power line.

3. An inrush current limiter as in claim 1 wherein a SOA protection circuit senses output current and utilizes sensed current values to, both a trigger to a timing circuit for establishing a maximum limitation to the duration of the surge, and a signal to control transistor 66 for providing the peak current limit control during the surge, a second circuit means wherein said trigger signal to said delay circuit activates a one-shot multivibrator which establishes the duration of the allowable surge in combination with the SOA characteristics of the transistor, said trigger signal from said current sensor being inverted and ORed with the output of said multivibrator for establishing a trigger signal to a flip-flop with said signal occurring coincident with said multivibrator output pulse and representing the maximum time allowed for the surge to exist wherein the signal from the flip-flop being ORed through diodes with the peak current control signal and overriding said current control signal to render control transistor 66 conductive in a latched manner through flip-flop action of the control transistor and resettable only by activation of a manual reset, wherein control transistor 66 functioning such that conduction of said transistor causes proportional non-conduction of the Darlington transistor of the inrush current limiter, latching on of said control transistor thereby resulting in the latching off of said limiter transistor thereby removing current from said limiter transistor before damage can occur, and a third circuit means for supplying isolated control power to said SOA protection circuit.

* * * * *